INVENTOR.
RANDOLPH S. RAE
BY Elliott & Pastoriza
ATTORNEYS

United States Patent Office
3,158,041
Patented Nov. 24, 1964

3,158,041
VARIABLE SPEED GEAR APPARATUS
Randolph S. Rae, 11740 Sunset Blvd.,
Los Angeles 49, Calif.
Filed Mar. 11, 1963, Ser. No. 264,340
6 Claims. (Cl. 74—690)

This invention relates generally to gearing and more particularly to an improved variable speed gear apparatus.

One known type of variable speed gear apparatus operates on the principle of rotating a conical surface about its axis and then varying the position of a roller or wheel in frictional engagement with the conical surface. The conical surface and roller necessarily have smooth engaging surfaces since the use of conventional gear teeth would result in binding. This is because the radius of the conical surface decreases constantly towards the apex of the cone. However, if smooth surfaces are employed, the only position at which the roller member will be frictionally driven by the conical surface without any shear stresses being developed in the engaging surfaces is when the roller member itself is provided with a conical surface and the projected apex of this surface coincides with the apex of the driving conical surface.

The establishment of shear stresses would not be serious if the contact area between the engaging surfaces can be kept relatively small. However, in order to provide a relatively large torque, a larger area between the surfaces is necessary. This larger surface results in one part of the roller being closer to the apex of the conical driving surface than the other and because of the different velocity relationships established when the roller is at positions different from that in which its projected apex coincides with the apex of the driving cone, the undesirable shear stresses are developed.

With the foregoing in mind, it is a primary object of this invention to provide a novel variable speed gear apparatus in which the foregoing problem is overcome.

More particularly, it is an object to provide a variable speed gear apparatus employing a variable diameter surface in which a relatively large roller member surface contact can be realized to provide sufficient torque and yet in which any shear stresses are minimized for any particular position of the roller member in engagement with the surface.

Still another object is to provide a variable speed gear apparatus in which an output shaft may be caused to rotate from a given speed in one direction and then decreased through zero to rotate in an opposite direction so that continuous speed changes through zero are realizable.

Briefly, these and many other objects and advantages of this invention are attained by providing a first rotating member having a surface of revolution about its rotating axis defined by a tractrix curve. Cooperating with this tractrix surface is a second rotatable member in the form of a roller having a surface portion defined by part of a cone, the projected apex of this cone intersecting the axis of the tractrix curve at a point coinciding with the intersection of the tangent to the tractrix curve at the point of engagement between the conical surface and tractrix surface. By this arrangement, there will be developed substantially no shear stresses in the conical surface regardless of its relative position on the tractrix surface. This result is a consequence of the fact that a tangent to the tractrix surface is always constant in length when measured between its point of intersection with the axis of the tractrix surface and any point on the tractrix curve.

In accordance with further features of the invention, the foregoing principle is employed in a variety of different types of gear arrangements to provide different types of variable speed gear apparatuses, one such apparatus being capable of varying the speed of an output shaft through zero to rotate in an opposite direction.

A better understanding of the invention as well as some of the applications thereof will be had by now referring to the accompanying drawings, in which.

Figure 2:
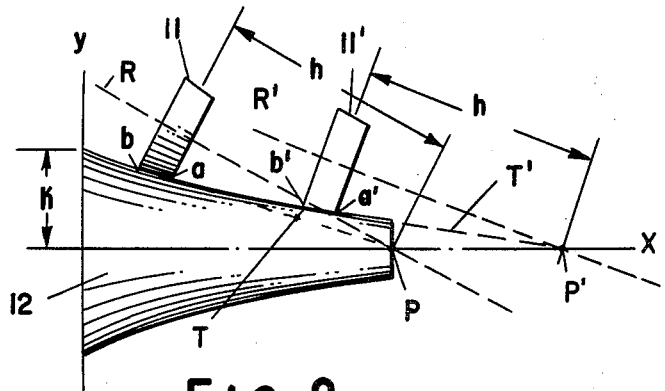
FIG. 2 is another schematic view similar to FIG. 1 but illustrating the novel variable speed gear principles of the instant invention.
Figure 3:
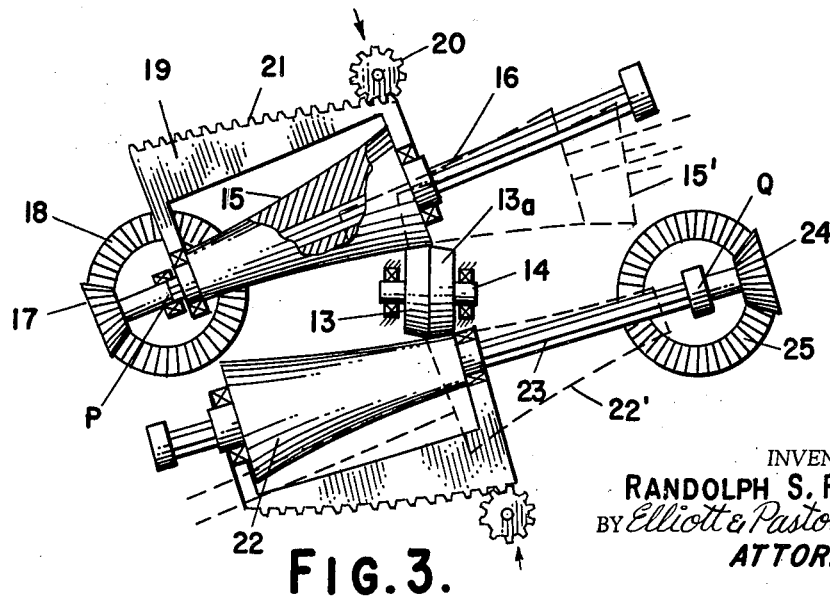
Figure 4:
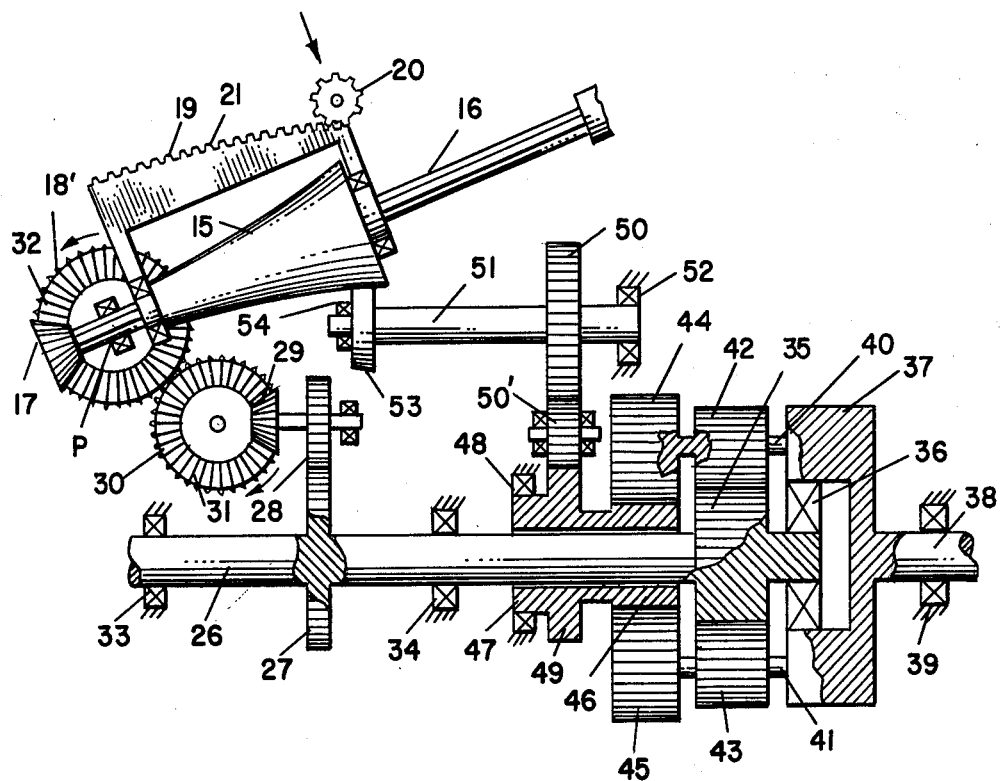

FIG. 3 is an elevational view, partly broken away, of a first embodiment of the principles describing in conjunction with FIG. 2; and, FIG. 4 is another elevational view partly in cross section and partly broken away illustrating a second embodiment of the invention for providing an output shaft capable of varying in speed in one rotational direction through zero to rotate in an opposite direction.

Figure 1:
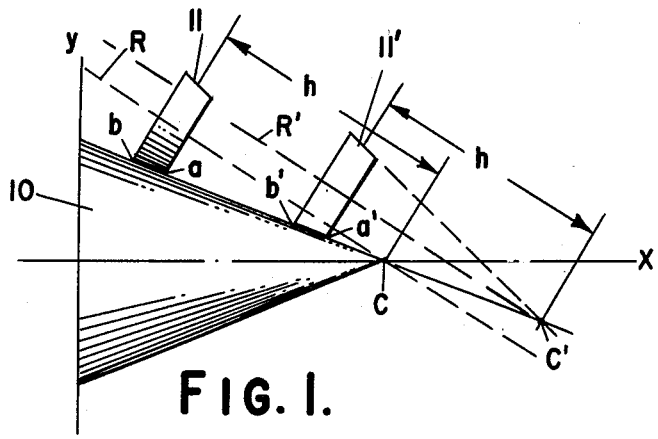
FIG. 1 is a schematic illustration of one type of conventional variable speed gear apparatus useful in discussing the problems which the instant invention is designed to overcome.

Referring first to FIG. 1 there is schematically illustrated a conical surface 10 which may be rotated about an axis $x$ at a constant speed. Cooperating with the conical surface 10 is a roller 11 also provided with a surface constituting a portion of a cone. If the position of the roller 11 is shifted along the conical surface 10 while the conical surface 10 is rotating, the rotational speed imparted to the roller 11 will be varied because of the changing diameter of the conical surface 10. This structure thus provides one known type of variable speed gearing.

If the roller 11 is provided with a cylindrical surface, shear stresses will be developed therein when in frictional engagement with the conical surface 10. These stresses result because the front portion of the cylindrical surface would be closer to the apex C of the conical surface than would be the rear portion of the cylindrical surface. Since the peripheral surface portions of the conical surface 10 travel at increasing speeds the further they are from the apex C, there will result slippage at the front and rear edges of a cylindrical surface roller resulting in sheer forces.

The foregoing may be overcome by providing the roller 11 with a conical surface in which the projected apex of the conical surface coincides with the apex C for the surface of the cone 10. In this event, all points in engagement such as the front and rear points $a$ and $b$ will move with the same speed so that no shear forces will be developed.

The absence of shear forces as described above will only occur, however, when the conical roller 11 is in one given position wherein its projected apex coincides with the apex of the cone 10. If the roller 11 is now shifted such as to the position 11', the projected apex of the roller indicated at C' is no longer coincident with the apex C of the conical surface 10. As a result, the velocity relationships at the new points $a'$ and $b'$ will be different resulting again in the establishment of shear forces.

Stated somewhat differently, the lack of correspondence of velocities at the ponits $a'$ and $b'$ is a result of the fact that the projected length $h$ of the apex of the roller 11 measured along its axis R is of a different length than the distance from the apex C of the conical surface 10 to the position of the roller when the roller is in the position 11' and its axis is in the position R'. Thus the velocity of $a'$ and $b'$ on the conical surface 10 will be different from the velocity of these points on the roller 11' when the roller is in the 11' position.

In order to avoid or substantially eliminate such shear forces resulting from velocity differences, it would be necessary for the projected apex of the conical surface of the roller 11 to always correspond with the apex C for the cone 10, but since there is only one position of the roller meeting this requirement, this desired variable speed feature is lost.

Referring now to FIG. 2 there is illustrated in a manner similar to FIG. 1 the principles of the present invention constituting an improved variable speed gearing as compared with that shown in FIG. 1.

Thus with reference to FIG. 2 there is shown a surface 12 constituting a surface of revolution about the $x$ axis defined by a tractrix curve. The tractrix curve has the property that a tangent to the curve at any point is always of equal length when measured between such point and its intersection with the $x$ axis or axis of the curve. If $k$ represents the $y$ intercept of the curve, the equation of the tractrix curve by which the surface of revolution 12 is defined is given by:

$$x = \pm k \left[ \cos h^{-1} \frac{k}{y} - \sqrt{1 - \left(\frac{y}{k}\right)^2} \right]$$

Thus with reference to FIG. 2 a tangent line T extending from the roller 11 to the point P at which it intercepts the $x$ axis is of the same length as a tangent T' drawn from the position of the roller 11' to a second point P' on the $x$ axis. With the condition stipulated that the tangent to the curve at any point must always be of a constant length when measured to its point of intersection on the $x$ axis, the foregoing equation may readily be derived.

As shown in FIG. 2 the projected apex of the conical roller 11 intersects the $x$ axis at point P. This conical surface for the roller 11 is defined by a cone of altitude $h$ which is made of such length as to intersct the $x$ axis at the same point as the constant tangent T for the tractrix curve. As a consequence, when the tractrix surface 12 is rotated about the $x$ axis, the velocity relationships at the points $a$ and $b$ and at the points $a'$ and $b'$ will be in substantial correspondence regardless of the position of the roller 11 along the surface. Again this is a direct result of the fact that the projected apex of the conical surface of the roller 11 intersects the $x$ axis at all times at the same point that the tangent to the tractrix curve intersects the axis when drawn from the point of engagement of the roller with the tractrix curve. This coincidence is illustrated at P' for the tangent T' and position of the roller at 11'.

The surface of the roller 11 could be slightly crowned to provide a more complete surface contact. However, this will not differ materially from a substantially conical surface.

In accordance with a first important feature of the present invention, there is accordingly provided a means for varying the speed of a roller by moving it along a surface of revolution wherein substantially no shear forces are developed.

The foregoing principles may be taken advantage of in the provision of various different types of gear arrangements to provide variable speed gear apparatus. For example, in FIG. 3 there is illustrated in the center of the drawing a conical roller surface 13 mounted on an output shaft 14 to rotate in a fixed position. As shown, the conical surface 13 is arranged to engage a tractrix surface of a first rotatable member 15. This member is rotatably mounted on a splined shaft 16 so that it will rotate with the shaft 16 but may be shifted axially along the shaft as indicated by the dotted lines 15'. One end of the splined shaft 16 terminates in a first bevel gear 17 constituting part of an input drive means including a second bevel gear 18 mounted for rotation about an axis normal to the axis of the splined shaft 16. This later axis for the second bevel gear 18 passes through a given point P which may include a journal bearing for the splined shaft 16.

The arrangement is such that a rotation may be imparted to the splined shaft 16 and thus to the tractrix surface 15 while the splined shaft 16 is swung about the given point P. This point P in FIG. 3 coincides with the projected apex of the conical surface 13 of the roller member on the shaft 14.

Suitable actuating means for effecting a shifting of the tractrix surface 15 along the splined shaft 16 may take the form of an elongated member 19 having opposite ends terminating in bearings coupled to the ends of the tractrix surface 15. The elongated member 19 may be moved by a gear 20 meshing with rack teeth 21 on a cam surface. As indicated by the small arrow, the gear 20 is biased downwardly to urge the tractrix surface 15 through the medium of the elongated member 19 against the conical surface 13.

In the operation of the structure described thus far, it will be evident that if input power is applied to the second bevel gear 18 to rotate the bevel gear 17, a rotation will be imparted through the splined shaft 16 to the tractrix surface 15. The tractrix surface 15 in turn will impart this rotation to the conical surface 13 on the output shaft 14. In the solid line position illustrated, the output shaft will be caused to rotate at maximum speed.

If now the tractrix surface 15 is shifted towards the dotted line position 15', it will be evident that the lesser diameter portions of the tractrix surface 15 will engage the conical surface 13 so that the output shaft 14 will be caused to rotate at a decreased speed. This shifting of the tractrix surface 15 is effected by means of the gear 20 cooperating with the cam rack teeth 21. In this connection, the rack teeth follow the cam surface which is increasingly spaced from the tractrix surface 15 in a direction towards the smaller end of the tractrix so that the gear 20 may have its axis in a stationary position when rotated. The splined shaft is thus swung about the point P as the surface is shifted. The arrangement thus insures continuous surface engagement and enables a continuously variable speed drive for the output shaft 14 to be realized.

As also illustrated in FIG. 3, it is possible to add to the structure shown by providing an additional conical surface 13a constituting a mirror image of the conical surface 13 on the output shaft 14. Also an additional tractrix surface 22 may be provided operating on a splined shaft 23 terminating in a bevel gear 24. This bevel gear 24 in turn is connected to an output bevel gear 25 so that the splined shaft 23 can swing about a given point Q. A similar actuating means may be provided for shifting the additional tractrix surface 22 along the splined shaft 23 operable in the same manner as that described for actuating means 19, 20, and 21.

With the apparatus shown in FIG. 3, the splined shaft 23 cooperating with the bevel gears 24 and 25 provides an alternate output. Thus, the speed of the bevel gear 25 when the various components are in their solid line positions, will be a maximum whereas when the tractrix surfaces are in the dotted line positions illustrated, the speed of the bevel gear 25 will be minimum. The variations thus realizable with an output connected to the bevel gear 25 are approximately double that realizable with an output connected to the output shaft 14.

With reference now to FIG. 4, there is shown a second embodiment of the invention in which an output shaft may be varied in speed through zero to rotate in an opposite direction. Such a gear train would find application in steering tanks or similar vehicles wherein it might be desired to provide a constant rotating source of power for driving traction belts at various speeds down through zero and even in reverse directions.

As shown in FIG. 4, this gearing apparatus includes a main power shaft 26 which may be driven at a constant rotational speed by any suitable motor or other power source. As shown the power shaft 26 is arranged to rotate a gear 27 forming as an integral part thereof. The gear 27 in turn is coupled to an input gear means including a gear 28, bevel gear 29, and a second bevel gear 30 having its axis normal to the axis of the bevel gear 29. As shown the bevel gear 30 is a compound gear including straight teeth 31 about the body portion thereof. These straight teeth 31 in turn are arranged to mesh with straight teeth 32 on the bevel gear 18'. Bevel gear 18' serves the same function as the bevel gear 18 in the embodiment of FIG. 3 and as shown will drive a bevel gear 17 connected to a splined shaft 16. The various components of the variable speed portion of the mechanism are designated by the same numerals in FIG. 4 as are employed in FIG. 3 since the structural elements themselves may be identical. Description of the operation of the tractrix surface 15, actuating means 19, etc. is therefor not believed necessary.

With reference once again to the main power shaft 26, the shaft is rotatably supported by bearings 33 and 34. The right hand end of the shaft terminates in a shaft sun pinion gear 35. Beyond the sun pinion gear 35 there is provided a portion of the shaft cooperating with bearings 36 for rotatably mounting to the shaft a cage structure 37. This cage structure includes a co-axial output shaft 38 supported by bearings 39.

The cage structure 37 itself rotatably mounts first and second shafts 40 and 41 in turn integrally connected to pinion gears 42 and 43 and larger diameter pinion gears 44 and 45. These pinion gears function as planetary gears and rotate together as indicated by their integral connection in the broken away portion for the gears 42 and 44. Thus the planetary gears may rotate with shafts 40 and 41 in the cage 37 while the cage is stationary.

As shown, the cage planetary pinion gears 42 and 43 are in meshing engagement with the shaft sun pinion gear 35. An intermediate pinion gear 46 in turn is secured to an intermediate pinion gear body 47 mounted for rotation as by bearings 48 to rotate co-axially with respect to the power shaft 26. The intermediate pinion gear 46 is in meshing engagement with the additional planetary cage gears 44 and 45. The intermediate body 47 also includes a drive gear 49 in meshing engagement with a gear 50 through idler gear 50'. Gear 50 in turn is secured to a shaft 51 bearingly supported by bearings 52 and terminating in a roller member 53. The other side of the roller 53 terminates in bearings 54 for supporting the shaft 51. As shown, the surface of the roller member 53 is conical and cooperates with the tractrix surface 15 in the same manner as the conical surface 13 described in conjunction with FIG. 3.

In the operation of the gear apparatus illustrated in FIG. 4, assume that the power shaft 26 is rotated in a clockwise direction when viewed along its axis from left to right. With this directional rotation, the upper portion of the gear 27 will be coming out of the paper and the lower portion of the gear 27 will be going into the paper. The movement will pass through the input gear means including the gears 28, 29, 30, 32, to bevel gear 17 to rotate the splined shaft 16. The splined shaft 16 and tractrix surface 15 will thus be rotating in a clockwise direction when viewed from the free end of the shaft 16; that is, from right to left. This rotation of the tractrix surface 15 in turn will rotate the roller member 53 and gear 50 in a direction such that the upper portion of the gear 50 will be coming out of the paper and the lower portion will be going into the paper.

Since the gear 50 is coupled to the gear 49 on the intermediate body member 47 through the idler gear 50', the intermediate body member will be rotating in a clockwise direction when viewed along its axis from left to right; that is, in the same direction as the power shaft 26. The intermediate pinion gear 46 will thus be driving the planetary gears 44 and 45 on the cage assembly 37 at the same time that the shaft pinion sun gear 35 is driving the planetary gears 42 and 43 on the cage assembly. Because of the differences in the diameters of the shaft sun pinion gear, intermediate pinion gear and the cage planetary gears, the entire cage 37 will be caused to rotate to avoid any binding in view of the integral conection between the pairs of gears 42, 44 and 43, 45. In this connection, the ratio of the diameter of the shaft sun pinion gear 35 divided by the diameter of the planetary cage gear 42 is made equal to the ratio of the diameter of the additional planetary pinion gear 44 to the diameter of the intermediate pinion gear 46.

If the foregoing ratio is 1.414, the combination of the various gears will result in a 2 to 1 speed ratio between the intermediate body 49 and shaft 26. As a consequence, when the intermediate pinion gear 46 is rotating twice as fast as the power shaft 26, the cage assembly 37 will remain stationary, the gears 42, 44 and 43, 45 simply rotating with their shafts 40 and 41 in the cage assembly about stationary axes.

If now the rotational speed of the intermediate pinion gear 46 is decreased as by movement of the tractrix surface 15 along the splined shaft 16 to the right as viewed in FIG. 4, the cage assembly 37 will necessarily commence to rotate in a clockwise direction as viewed from the right. On the other hand, should the speed of the intermediate pinion gear 46 be increased by moving the tractrix surface 15 further towards the left as viewed in FIG. 4, the cage assembly 37 will commence rotating in a counter-clockwise direction as viewed from the right.

As a consequence of the foregoing, it will be evident that the rotational speed of the shaft 38 on the cage assembly 37 may be made to vary from a given speed in one direction, through zero to a given speed in the opposite direction. In this connection, it should be noted that the changes in speed are continuous and uniform as a consequence of the use of the tractrix surface 15.

When the foregoing gear apparatus is employed in a tank, there would be provided a second gear train identical to that shown in FIG. 4 for the wheels or belts on the opposite side of the tank so that with suitable levers connected to the actuating gear 20 as shown in FIG. 4 to move the tractrix, the wheels may be caused to be driven together or individually in directions such as to steer the tank or even reverse it or permit turning in circles.

From the above description, it will be evident that the present invention has provided a greatly improved variable speed gear apparatus. While only two embodiments have been set forth and described, it will be evident to those skilled in the art that the principles exemplified in FIG. 2 may be incorporated in many different types of gear structures. The variable speed apparatus is therefore not to be thought of as limited to the particular embodiments set forth merely for illustrative purposes.

What is claimed:

1. A variable speed gear apparatus comprising, in combination: a first rotatable member having a tractrix surface of revolution about its axis of rotation defined by a tractrix curve; a splined shaft axially passing through said first member to mount said member for rotation with said shaft and permit longitudinal movement of said member along said shaft; input means for rotating said shaft coupled to said shaft at a given point normal to the axis of said shaft so that said shaft is free to swing about said normal while said shaft is rotating; actuating means coupled to said first rotatable member to shift its position longitudinally along said shaft; a second rotatable member having a substantially conical surface whose projected apex coincides with said given point, said conical surface being in engagement with said tractrix surface; an output shaft mounting said second rotatable member for rotation in a fixed position; and an actuating means for shifting the longitudinal position of said first rotatable member along said splined shaft and simultaneously urging said tractrix surface into continuous surface engagement with said conical surface whereby the speed imparted to said conical surface by said tractrix surface is variable to vary the relative speeds of said splined shaft and said output shaft.

2. An apparatus according to claim 1, in which said input means includes a first bevel gear secured to the end of said splined shaft; a second bevel gear having an axis of rotation normal to the axis of said splined shaft and passing through said given point, said second bevel gear meshing with said first bevel gear; and journal bearing means swingably mounting said splined shaft for swinging movement about said axis of rotation of said second bevel gear.

3. An apparatus according to claim 1, in which said actuating means includes an elongated member having opposite ends terminating in bearings at each end of said tractrix surface, said elongated member having a cam surface of convex shape so that it is increasingly spaced from said tractrix surface towards the smaller end of said tractrix surface; and an actuating member for camming said elongated member in a direction towards said second rotatable member and including means for moving said elongated member to shift said tractrix surface along said splined shaft.

4. An apparatus according to claim 1, in which said second rotatable member includes an additional substantially conical surface constituting a mirror image of said first mentioned conical surface; an additional rotatable member having a tractrix surface of revolution in engagement with said additional conical surface; and an additional splined shaft, input means, and actuating means all similar to said first mentioned splined shaft, input means, and actuating means whereby said additional splined shaft is caused to rotate by said additional conical surface to provide an alternate output of variable speed for said apparatus.

5. An apparatus according to claim 1, including a power input shaft; input gear means coupling said power input shaft to said second level gear to rotate said first bevel gear and splined shaft, said power shaft terminating in a shaft sun pinion gear; a cage assembly rotatably mounted to said power shaft and including at least one cage planetary pinion gear coupled to said shaft sun pinion gear; at least one additional cage planetary pinion gear rigidly secured for axial rotation with said one cage planetary pinion gear and of different diameter; an intermediate gear means mounting an intermediate pinion gear coaxial with said power shaft and coupled to said additional cage planetary pinion gear and of different diameter; and output gear means coupling said intermediate pinion gear to said output shaft of said second rotatable member whereby the rotational speed of said cage may be varied by shifting said tractrix surface.

6. An apparatus according to claim 5, in which the ratio defined by the diameter of said shaft sun pinion gear divided by the diameter of said one cage planetary pinion gear is equal to the ratio defined by the diameter of said additional cage planetary pinion gear divided by the diameter of said intermediate pinion gear so that when the rotational speed of said power shaft is a given fraction of the rotational speed of said intermediate pinion gear, said cage is stationary and whereby said cage may be caused to rotate in one direction or the other by shifting said tractrix surface in one direction or the other along said splined shaft.

References Cited in the file of this patent
UNITED STATES PATENTS 1,844,239    Boehme et al. _____ Feb. 9, 1932

FOREIGN PATENTS 1,003,009    France _____ Nov. 14, 1951